T. R. TAYLOR.
Horseshoe Machine.
No. 1,458. Reissued April 21, 1863.
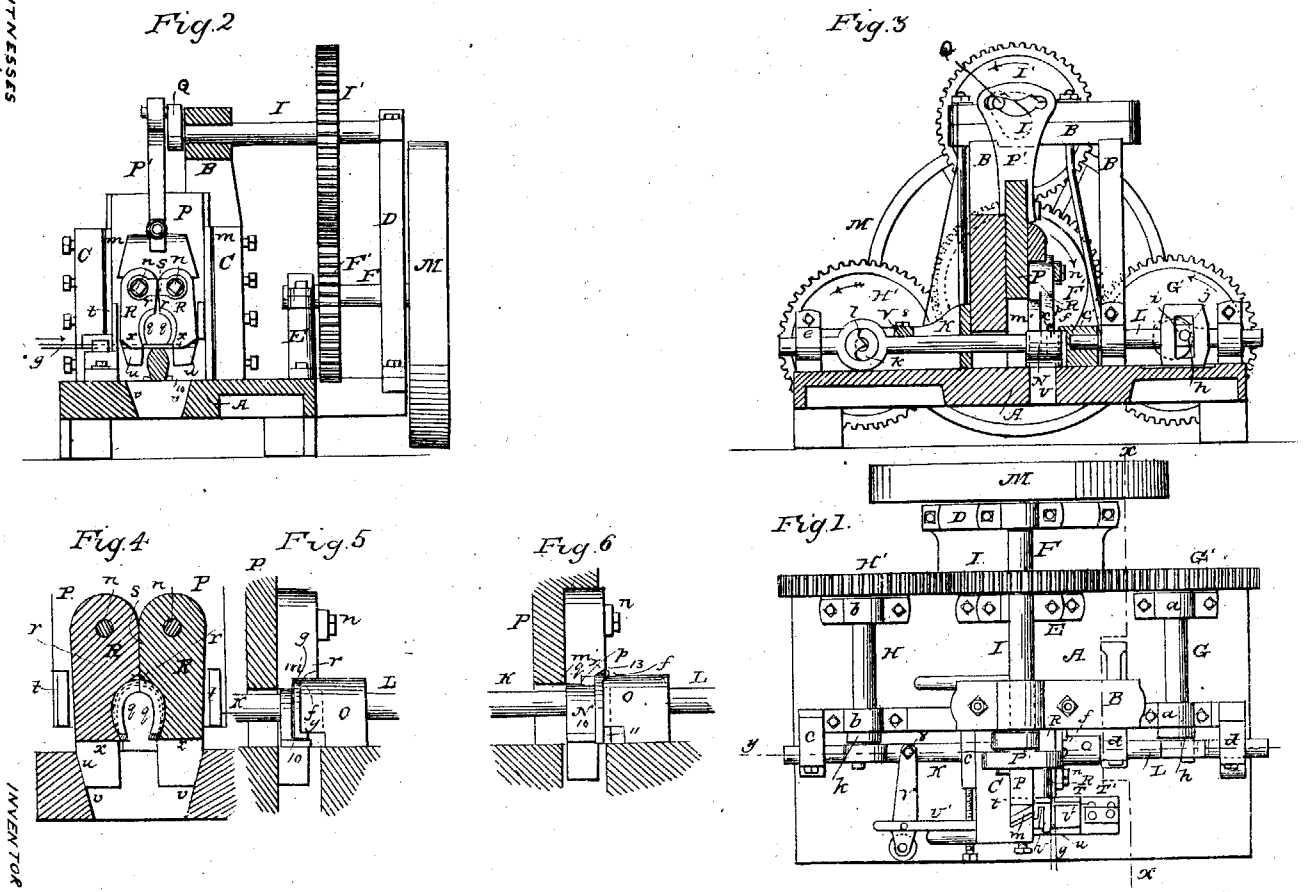
WITNESSES
J. W. Crumb
R. S. Campbell
INVENTOR
T. R. Taylor
per Munn & Co
Attorneys
N. PETERS. Photo-Lithographer, Washington, D. C.

UNITED STATES PATENT OFFICE.

THOMAS R. TAYLOR, OF BROOKLYN, NEW YORK.

IMPROVEMENT IN MACHINES FOR MAKING HORSESHOES.

Specification forming part of Letters Patent No. 27,750, dated April 3, 1860; Reissue No. 1,458, dated April 21, 1863.

*To all whom it may concern:*

Be it known that I, THOMAS R. TAYLOR, of Brooklyn, in the county of Kings and State of New York, have invented new and useful Improvements in Horseshoe-Machines; and I do hereby declare that the following is a full and complete description of the construction and operation of the same, reference being had to the accompanying drawings, making part of this specification, in which—

Figure 1 is a plan view. Fig. 2 is a vertical section in the direction of the line *x x* in Fig. 1. Fig. 3 is a vertical section in the direction of the line *y y*, and Figs. 4, 5, and 6 are vertical sections of the parts immediately concerned in the formation of the shoe.

Like letters refer to like parts.

My invention relates, first, to cutting off from a heated bar of iron a blank piece, bending, swaging, and creasing the same, thus forming a shoe by the joint and continuous operation of the mandrel, jaws, and dies, hereinafter described and set forth; second, to the reciprocating male die and mandrel conjointly with the female dies contained within mutually-reciprocating jaws, having also a motion perpendicular to that of the mandrel and male die; third, to the recessed reciprocating and swinging jaws; fourth, to the projections on the mandrel and the recesses in the male die for forming the heel-calks of the shoe; fifth, to the recesses in the male and female dies for forming the toe-calk of the shoe; sixth, to effecting the closing of the swinging jaws by their descent into an opening into the bed-plate, or by guides therein; seventh, to the attachment of a movable cutter to a slide connected to the mandrel upon which the shoe is formed, and by which the cutter is operated.

I first construct a strong bed-plate, A, upon which I erect the standards B C D E, constituting the frame-work of the machine.

F represents a horizontal main shaft having its bearings upon the standards D E. Upon the outer end of this shaft is placed the fly-wheel M. Upon the inner end, next to the bearing E, is placed a gear-wheel, F′.

G represents a shaft placed parallel to the shaft F, and resting in bearings shown at *a a* in Fig. 1. Upon the outer end of this shaft is placed a gear-wheel, G′, having the same number of teeth and being of the same diameter of the gear-wheel F′, and into which it gears.

H represents a shaft, also placed parallel to the shaft F′ and resting in bearings shown at *b b* in Fig. 1. The outer end of this shaft carries the gear-wheel H′, which is of the same diameter of the wheel F′, and into which it gears.

Directly above the shaft F is placed the shaft I, supported by the standards B and D and cross-beams B′ and D′. This shaft I carries a gear-wheel, I′, which is secured to the shaft I in a position vertical to the wheel F′, having the same diameter, and into which it gears. The gear-wheels F′, G′, H′, and I′, all having the same diameter and gearing into each other, as described, must necessarily, with their shafts, have corresponding periods of revolution in the direction indicated by the arrows in Fig. 3.

K and L represent two horizontal mandrels placed near the bed-plate in line with each other, but at right angles to the shafts F G H I, before described, and fitted to slide longitudinally in stationary guides *c c* and *d d*.

The mandrel K has secured to its inner end a head, N, whose external form, as shown in transverse section, Fig. 2, corresponds with the interior curve of the shoe, and which constitutes that part of the mandrel K around which the blank-iron is bent in the formation of the shoe. This head N has upon each lower angle a projection, (seen at 10 10,) which projections are set back from the end of the head a distance a little greater than the intended thickness of the shoe, as shown in enlarged sections, Figs. 5 and 6.

The mandrel K, with its head N, is caused to advance toward and recede from the mandrel L by an intermittent motion produced by a crank, *k*, upon the shaft H, working in a semicircular slot, *l*, upon the shaft of the mandrel K, this movement being effected during one-half of the revolution of the shaft H, the other half of the revolution marking the period of rest for the mandrel K—this period being when the mandrel K approaches nearest to the mandrel L.

The mandrel L has secured to its inner end a male die, O, which has a recess to fit the head N, into which it enters, as indicated by the dotted lines N′ in Figs. 5 and 6. The exterior form of the male die is that of the exterior curve of the shoe, the face of the die, therefore, being the exact size and shape of the shoe. The lower angles of this face have recesses 11 11, into which the iron of the shoe-blank is pressed by the projections 10 10 on the head N, thus forming the heel-calks of the shoe, as seen at *e* in Fig. 5.

At that part of the male die corresponding to the toe of the shoe is a recess, *f*, into which the iron is pressed, as hereinafter stated, to form the toe-calk of the shoe.

The face of the male die O is so formed as to crease the under side of the shoe and form the nail-prints.

The mandrel L, which carries the male die O, derives a regular reciprocating motion toward and from the head N of the mandrel K by means of a crank, *h*, upon the inner end of the shaft G, the wrist of said crank working in a box, *i*, Fig. 5, which is fitted to slide in a straight vertical box, *j*, in the mandrel L, the advancing movement taking place during one-half of every revolution of the shaft G and the retreating movement during the other half of every revolution.

The cranks *k* and *h* are so adjusted in relation to each other that the mandrel K, with its head M, nearly completes its advance toward the male die O before the advance of the latter commences, for reasons hereinafter set forth, and remains stationary during the advance of the male die.

The head N of the mandrel K, and the male die O of the mandrel L, can be removed at pleasure and others introduced, which is necessary in the formation of various-sized shoes.

A broad slide or cross-head, P, is fitted and arranged to work vertically in guides or ways *m m* in the standards C C. Its face is placed at right angles to the mandrels K and L. In the middle and lower part of this cross-head P is an opening, *m'*, Fig. 5, large enough to pass over the head N of the mandrel K. To the face of this cross-head P is attached, by means of two strong bolts, *n n*, two similar swinging jaws, R R, whose upper ends articulate in a semicircular seat. The front and inner edges of these jaws are each provided with a recess, *p p*. (Shown in Figs. 2 and 4.) These recesses have each the form of half a shoe, are in pairs, and when the jaws are closed constitute the female die, in which the shoe is formed by the joint action of the mandrel-head N, around which the blank is bent in the descent of the jaws, and the action of the male die O, as hereinafter more fully set forth. These recesses *p p* have their inner margins fitted to the external surface of the head N, which they embrace during the action of the male die. The faces of these recesses are so formed as to give a proper shape to the upper surface of the shoe, and the depth is sufficient to allow the male die to shove the forming-shoe along upon the head N a distance sufficient to form the calks, in the manner before stated. A recess, *r r*, aids in forming the toe-calks, as seen at *f* in Figs. 5 and 6.

The recesses *p p* may be formed in movable blocks or dies, so that they can be changed at pleasure for the production of different-sized shoes without the necessity of removing the entire jaws.

Between the jaws R R is placed a strong spring, (not shown in the drawings, but located at about the point indicated by the letter *s* in Fig. 4,) by which they are separated as far as the stops *t t* will allow when in the position shown in Fig. 2. The outer edges of the lower ends of the jaws are beveled off in a wedge form, (as shown at *u u* in Figs. 2 and 4,) so that they will more readily enter the opening *v v* in the bed-plate, the sides of which are also inclined planes, the opening being widest at the top, so that the jaws are forcibly closed as they are caused to descend, as shown in Fig. 4. Upon the lower end of each of the jaws are shown slots *z z*, which embrace the shoe-blank as the jaws descend to prevent it from turning flatwise upon the head N.

The cross-head P has a neck or connecting-rod, P', the upper end of which is provided with a curved slot, *w*, in which works the wrist of the crank Q, attached to the inner end of the shaft I, by which means an upward and downward movement of the jaws is effected. The ends of the slot *w* are about horizontal to each other. The middle portion, embracing about two-thirds of the whole, is curved downward, as shown in Fig. 3, forming a segment of a circle, of which the length of the crank Q is the radius, the form of the slot and the adjustment of the crank being such in their relation to the wheels G' and H' that the cross-head P and jaws R R commence their descent soon after the mandrel K advances, so as to bring the head N beneath the jaws and to continue their descent after the mandrel K has ceased to advance, and to remain stationary at their lowest point (the jaws being closed) while the male die O advances to give its pressure, and the mandrel-head N and male die O are withdrawn. The jaws are then raised to their former position.

T represents a fixed cutter, secured to a block, T', and so attached to the bed-plate by bolts, which pass through slots therein, as to allow the cutter to be moved out or in to regulate the length of the blank for the shoe.

A movable cutter, U, is attached to a horizontal slide, U', which works parallel with the mandrels K and L through a guide in the standard C, and rests on the cutter-block T'. The slide U is continuous with a rod, *v'*, and thus connected to a horizontal lever, V, one end of which has a fixed fulcrum, 7, and the other end is secured to the mandrel K by a pin, 8, so that the cutter U advances to cut off the bar at the same time that the mandrel K advances. An adjustable stop (not shown in the drawings) is placed opposite the cutters to gage the length of the blank for the shoe.

The operation of this machine is as follows:

Power being applied to the fly-wheel M by means of a driving-belt, to give rotary motion to the shaft F in the direction of the arrow marked upon the wheel F′ in Fig. 3, the shafts G H I are caused by their gearing to rotate in the direction of the arrows marked upon their gear wheels, and the several parts of the machine are caused to have the relative movements already described.

Every time the cross-head P and jaws R R are raised, the bar 9, from which the shoe is to be made, having been previously heated, is pushed by the attendant of the machine, in the direction of the arrow shown near it, through the groove 12 in the top of the cutter-slide U′, and through the grooves *z z* in the jaws, until it meets the adjustables top before mentioned, but not shown. The mandrel K then advancing with the head N brings forward the cutter U, cutting off the blank to form the shoe. The jaws R R, immediately descending, receive the metal in the front part of the recesses *p p*, and bend it over the head N, and as they enter the opening *v v* in the bed-plate close the heel part of the shoe closely upon the lower part of the head N, and swaging the iron so as to force a sufficient portion upward into the recess *r*, as shown at *f* in Fig. 6, to form the toe-calk. The jaws then remain stationary and firmly closed, while the mandrel L advances with the male die and drives the partly-formed shoe back along the head N till it arrives at the face of the recesses *p p*, constituting the female die, by which operation the heel-calks are formed, as shown in Fig. 5, as well as the toe-calk, as shown at *f* in the same figure. The male die O, still advancing, gives its final pressure, thus completing the formation of the shoe. The two mandrels K and L now retire to their former position, carrying with them the head N and male die O, respectively, when the jaws ascend and open, and the shoe falls through the opening *v v* to the ground, and the machine is ready for another action.

What I claim as my improvement, and desire to secure by Letters Patent, is—

1. Cutting off from a heated bar of iron a blank piece, then bending, swaging, pressing, and creasing the same, thus forming a shoe by the joint and continuous operation of the described mandrel-head N, jaws R R, and female dies *p p*, and male die O, substantially as herein set forth.

2. The reciprocating male die O and mandrel-head N, conjointly with the female dies *p p*, contained within mutually-reciprocating jaws R R, arranged and operating as and for the purpose specified.

3. The recessed, reciprocating, and vertically-swinging jaws R R, together with the closing of the same by their descent into an opening in the bed-plate, as and for the purpose described.

4. The projections 10 10 on the mandrel-head N and the recesses 11 11 on the male die O, for forming the heel-calk of the shoe, in the manner specified.

5. The recesses *r r* in the female dies and the recess *f* in the male die, for forming the toe-calk, as set forth.

6. Operating the cutter U by the movement of the mandrel K, lever V, slider U′, and rod *v′*, as and for the purpose specified.

THOS. R. TAYLOR.

Witnesses:
E. S. HULBURD,
HENRY L. THOMAS.